United States Patent [19]

Palacio et al.

[11] Patent Number: 4,466,223
[45] Date of Patent: Aug. 21, 1984

[54] INSULATION SUPPORT CLIP

[75] Inventors: Joaquin J. Palacio; Carlos C. Cristobal, both of Miami, Fla.

[73] Assignee: Gang-Nail Systems, Inc., Miami, Fla.

[21] Appl. No.: 456,341

[22] Filed: Jan. 7, 1983

[51] Int. Cl.³ .............................................. E04B 1/74
[52] U.S. Cl. ..................................... 52/404; 248/293
[58] Field of Search ..................... 248/289.1, 290, 291, 248/293, 294, 216.1, 217.2, 217.3; 52/407, 712, 404

[56] References Cited

U.S. PATENT DOCUMENTS

| | | | |
|---|---|---|---|
| 2,251,348 | 8/1941 | Zimmer | 248/293 |
| 2,565,206 | 8/1951 | Day et al. | 52/407 |
| 3,090,588 | 5/1963 | Monette | 248/217.3 |
| 3,355,203 | 11/1967 | Stauffer | 52/404 |
| 3,708,942 | 1/1973 | Leonard | 52/693 |
| 3,959,945 | 6/1976 | Allen | 52/696 |
| 4,172,345 | 10/1979 | Alderman | 52/407 |
| 4,239,008 | 12/1980 | Conlon | 52/404 |
| 4,246,736 | 1/1981 | Kovar et al. | 52/712 |
| 4,333,575 | 6/1982 | Wong | 248/293 |
| 4,375,741 | 3/1983 | Paliwoda | 52/404 |

FOREIGN PATENT DOCUMENTS 1272151 3/1961 France ............................ 52/404
4350 11/1891 Switzerland ................. 248/294

Primary Examiner—James L. Ridgill, Jr.
Attorney, Agent, or Firm—LeBlanc, Nolan, Shur & Nies

[57] ABSTRACT

A clip for supporting insulation suspended between spaced apart wooden members. The clip includes a bracket having first and second sections which are joined together in an approximately 90° angle. The first section of the bracket has a plurality of teeth projecting generally orthogonally therefrom for attaching the clip to a wooden member from which insulation is to be supported. A support member, which is rotatably attached to the second section, is adapted to be rotated to a position which extends in the same direction as the second section extends from the first section for supporting insulation when the teeth are attached to the side of a wooden member. Preferably, the support member is elongated and has a length which is approximately equal to one-half the distance between adjacent wooden members to which the clip is adapted to be attached for supporting insulation. The clip may be attached to the vertical faces of a lower wooden member in a truss which is assembled at a factory to minimize the labor required for installing insulation between spaced apart wooden members at a job site.

1 Claim, 4 Drawing Figures

INSULATION SUPPORT CLIP

BACKGROUND OF THE INVENTION

1. Field of the Invention

The invention pertains to apparatus used for securing insulation between horizontally disposed parallel spaced apart wooden members without the use of fasteners.

2. Description of the Prior Art

It has been common practice for many years in the construction industry to attach insulation to horizontally disposed spaced apart wooden members such as those found in the floors or ceilings of buildings. Typically, insulation has been attached by the use of stapling the edges of the insulation to the sides of the spaced apart solid wooden members between which the insulation is disposed. In addition, it has been the practice to attach wires between the adjacent spaced apart horizontally disposed wooden members for retaining the insulation between the wooden members without the need for stapling or other methods of fastening. A primary disadvantage of using wires for securing insulation between horizontally disposed wooden members is the labor requirement. U.S. Pat. Nos. 3,355,203 and 2,565,206 each disclose wire insulation retainers.

It is also common practice to secure insulation between spaced apart horizontally disposed manufactured truss assemblies by methods completely carried out at the construction site. Prior to the present invention, there has been no effective insulation supporting element for use in conjunction with manufactured trusses which could be applied at a manufacturing facility and shipped to the job construction site without damage or destruction of the elements which are to be used for supporting the insulation.

The insulation supporting elements described above in U.S. Pat. Nos. 3,355,203 and 2,565,206 suffer from the disadvantage that they cannot be attached to manufactured trusses at a manufacturing site for trusses. Moreover, once in place, the insulation retainers of the aforementioned patents can interfere with the placement of the insulation between parallel spaced apart wooden members. To effectively use these retainers, the insulation must be held in place by some mechanism while the worker places the retaining wires in place between the wooden members.

SUMMARY OF THE INVENTION

An object of the present invention is to provide an insulation retainer for securing insulation between parallel trusses which may be secured to the trusses at a manufacturing facility and shipped to the construction site without the likelihood of substantial damage.

Another object of the present invention is to provide retainers for suspending insulation between spaced apart wooden members which may be attached to the wooden members prior to installation of the insulation without the use of substantial labor.

A further object of the present invention is to provide retainers for suspending insulation from parallel horizontally disposed wooden members which may be attached to the wooden members at positions which do not interfere with the subsequent positioning of the insulation between the parallel horizontally disposed wooden members.

A still further object of the present invention is to provide an insulation retainer which may be installed at a manufacturing site and thereafter may be positioned without substantial labor to support insulation after the truss is installed at the job site.

A clip for retaining and supporting insulation suspended between spaced apart horizontally disposed wooden members includes a bracket having first and second sections which are joined together in an approximately 90° angle. The first section has a plurality of teeth projecting generally orthogonally from the first section in the direction that the second section extends from the first section for embedment in a wooden member from which insulation is to be supported. A support member is rotatably attached to the second section which support member is adapted to be rotated to a position which extends in the same direction as the second section extends from the first section for supporting insulation when the clip is attached to the side of a wooden member. Preferably, the support member is elongated and has a length equal to approximately one-half the distance between adjacent wooden members to which the clip is adapted to be attached for supporting insulation.

A truss assembly in accordance with the invention includes upper and lower wooden members which are connected together to form a truss having a longitudinal axis. A lower, or the bottom, wooden member extends in a direction parallel to the longitudinal axis of the truss and has side faces. A plurality of clips, which are adapted for supporting insulation from the truss, are attached to the bottom wooden member at spaced apart locations. Each clip has a bracket having first and second sections which are joined together in an approximately 90° angle. The first section has a plurality of teeth projecting generally orthogonally from the first section in the same direction that the second section extends from the first section which teeth are embedded in the side face of the lower wooden member at the spaced apart locations. A support member is rotatably attached to the second section. This support member is adapted to be rotated to a position so as to extend in the same direction that the second section extends from the first section for supporting insulation when the clip is attached to the bottom wooden member. In the preferred form of the present invention, the support member of each clip is elongated and has a length which is equal to approximately one-half the distance between adjacent wooden members to which the clip is adapted to be attached for supporting insulation.

The invention has several advantages not realized by the prior art. The pivotable attachment between the support member and the second section of the bracket permits the support clip to be fixably attached to the side faces of a lower wooden member in a manufactured wooden truss and shipped to a construction site in an unexposed position without damage to the clip. The amount of labor for installing insulation is minimized at a job site. With the invention, insulation may be installed at a job site by a single workman by rotating the support member in a direction orthogonal to the longitudinal axis of the truss after the insulation has been positioned between horizontally disposed parallel spaced apart trusses.

The support clip of the invention also may be used for retaining and supporting insulation between horizontally disposed parallel spaced apart solid wooden trusses by the embedding of the teeth projecting orthogonally from the first section of the bracket in the bottom area of the side faces of a solid wood truss, positioning the insulation between parallel spaced apart adjacent trusses and rotating the support member to a position orthogonal to the side faces of the truss to hold the insulation between the adjacent trusses.

The support clip of the present invention also may be used for installing insulation between spaced apart parallel wooden members which are inclined with respect to the horizontal such as in roof trusses.

DESCRIPTION OF THE PREFERRED EMBODIMENT

Figure 1:
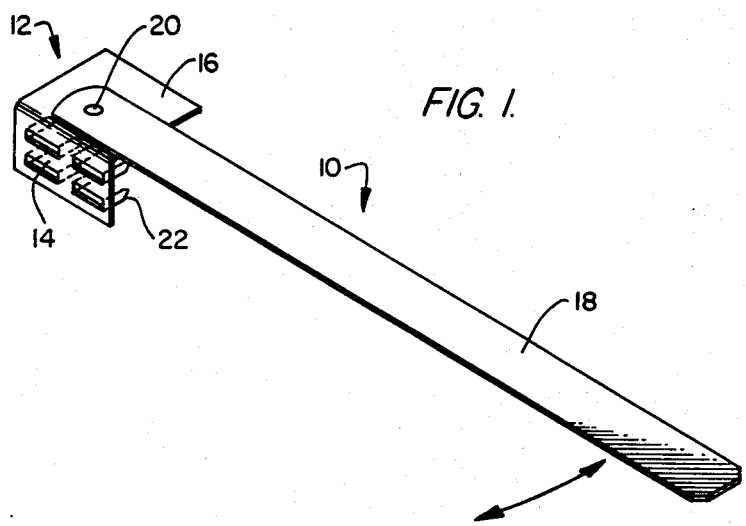
FIG. 1 is a perspective view of a support clip for supporting insulation in accordance with the present invention.
Figure 2:
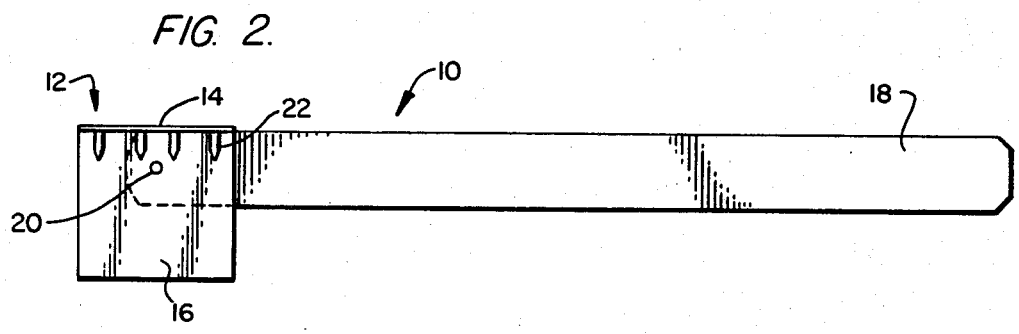
FIG. 2 is a bottom view of a clip for supporting insulation in accordance with the present invention.

An insulation support clip 10, as shown in FIGS. 1 and 2, has a bracket 12 with a first section 14 which is orthogonally joined to a second section 16 and a support member 18 which is pivotably attached to the bottom surface of the second section 16. The pivotable connection 20 may be of any known type including a rivet. The pivotable connection 20 permits the support member 18 to be rotated from a position parallel to the longitudinal axis of the truss, which is useful for shipping trusses from a manufacturing site to a construction site, to a position which extends orthogonally from the sides of a truss for supporting insulation between parallel spaced apart trusses to which the clip 10 is attached. The first section 14 has a plurality of teeth 22 struck from the first section and projecting in the same direction which the second section 16 projects from the point of connection with the first section.

While the teeth 22 may be manufactured in accordance with any known process, preferably they are manufactured in accordance with the commonly assigned U.S. Pat. No. 4,343,580. Preferably, the support member is elongated and has a length approximately equal to one-half the spacing between adjacent spaced apart parallel wooden members to which the support clips of the present invention are adapted to be attached.

Figure 3:
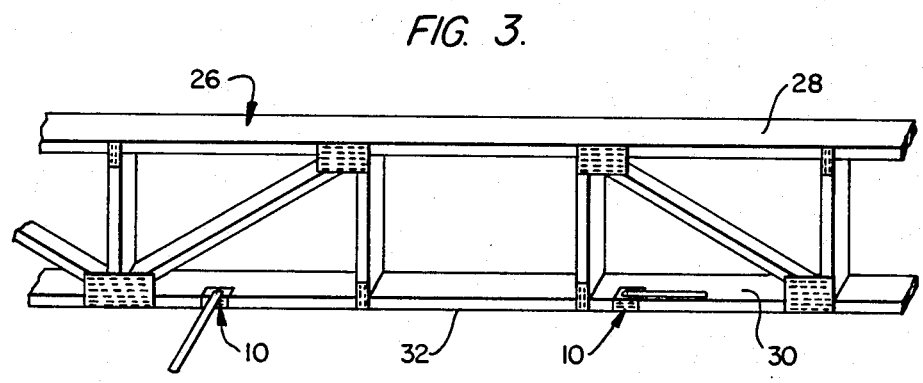
FIG. 3 is a perspective view illustrating the attachment of insulation support clips of the present invention to a manufactured truss.
Figure 4:
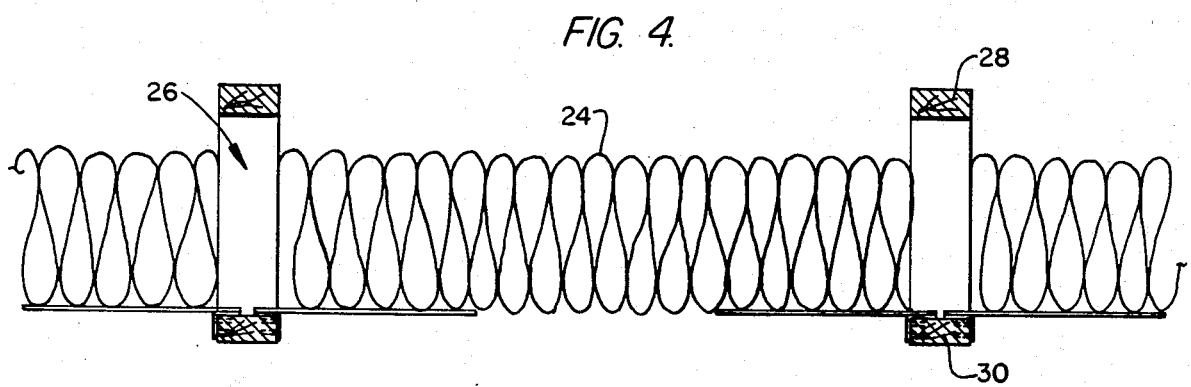
FIG. 4 is an end view of a plurality of spaced apart horizontally disposed trusses illustrating the use of support clips for retaining and supporting insulation between lower wooden members of adjacent trusses in accordance with the present invention.

The use of the support clip 10 for supporting insulation 24 from manufactured wood trusses 26 is illustrated in FIGS. 3 and 4. Each of the support clips 10 is attached to the trusses 26 by embedding the teeth 22 in the side faces of the lower wooden member of the truss. Each truss 26 has an upper wooden member 28 and a lower wooden member 30 which typically are 2"×4"s. The truss 26 has a height extending between the upper wooden member 28 and the lower wooden member 30 which is orthogonal to the longitudinal axis of the truss. The support clips 10 are attached at spaced apart locations along the longitudinal axis of the truss 26. The teeth 22 are embedded in the faces 32 of the lower wooden member 30 which are parallel to the height of the truss 26.

The clip 10 shown on the right side of FIG. 3 illustrates the position to which the support member 18 is pivoted for purposes of shipping the truss from a manufacturing site to a construction site and during the installation of the truss 26 at the construction site. The support clip 10 shown on the left side of FIG. 3 illustrates the position for supporting insulation 24 between adjacent spaced apart parallel trusses 26.

While the invention has been illustrated in connection with trusses 26 which are of the type manufactured at a manufacturing site remote from the construction site, it should be clearly understood that the present invention may be used for supporting insulation from solid wood trusses by embedding the teeth 24 in the side faces of the bottom of a solid wood truss. Moreover, the support clip 10 may be attached to manufactured wooden trusses 26 or solid wood trusses at the job site.

While the preferred use of the support clip 10 is to suspend insulation from horizontally disposed parallel spaced apart trusses, it should be clearly understood that the present invention also may be used to suspend insulation from parallel spaced apart non-horizontally disposed wooden members such as roof trusses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A truss assembly comprising:
   (a) upper and lower wooden members interconnected to from a truss having a longitudinal axis and a height orthogonal to the longitudinal axis, said lower wooden member being parallel to the longitudinal axis of the truss and having side faces parallel to the height of said truss;
   (b) a plurality of insulation retaining clips for supporting insulation from said truss, said clips being attached to the side faces of said lower wooden member at spaced apart locations along said lower wooden member for supporting insulating material between adjacent truss assemblies;
   (c) each of said clips including a bracket having first and second sections joined together to from an approximately 90° angle, said first section having a plurality of teeth struck therefrom and projecting generally orthogonally from said first section in the same direction that said second section extends from said first section for embedment of said teeth in the side face of said lower wooden member at the spaced apart locations, said second section lying on the upper surface of said lower wooden member and an elongated support member rotatably attached to said second section, said support member being rotatable to a position extending in the same direction as said second section extends from said first section for supporting insulation; and,
   (d) the length of said support member being equal to approximately one-half the distance between adjacent truss assemblies to which said clip is attached for supporting insulation.

* * * * *

UNITED STATES PATENT AND TRADEMARK OFFICE
CERTIFICATE OF CORRECTION

PATENT NO. : 4,466,223

DATED : August 21, 1984

INVENTOR(S) : Joaquin J. Palacio et al

It is certified that error appears in the above-identified patent and that said Letters Patent is hereby corrected as shown below:

Column 4, line 38, change "from" to --form--.

Column 4, line 50, change "from" to --form--.

Signed and Sealed this

Fifteenth Day of January 1985

[SEAL]

Attest:

GERALD J. MOSSINGHOFF

Attesting Officer

Commissioner of Patents and Trademarks